(12) United States Patent
Hood

(10) Patent No.: US 9,299,994 B2
(45) Date of Patent: Mar. 29, 2016

(54) FUEL CELL ASSEMBLY

(71) Applicant: Intelligent Energy Limited, Loughborough (GB)

(72) Inventor: Peter David Hood, Loughborough (GB)

(73) Assignee: Intelligent Energy Limited, Loughborough (GB)

( * ) Notice: Subject to any disclaimer, the term of this patent is extended or adjusted under 35 U.S.C. 154(b) by 0 days.

(21) Appl. No.: 14/398,253

(22) PCT Filed: Apr. 24, 2013

(86) PCT No.: PCT/GB2013/051041
§ 371 (c)(1),
(2) Date: Oct. 31, 2014

(87) PCT Pub. No.: WO2013/164572
PCT Pub. Date: Nov. 7, 2013

(65) Prior Publication Data
US 2015/0132673 A1    May 14, 2015

(30) Foreign Application Priority Data

May 1, 2012   (GB) .................................. 1207582.6
Dec. 10, 2012 (GB) .................................. 1222166.9

(51) Int. Cl.
*H01M 8/04*   (2006.01)
*H01M 8/24*   (2006.01)

(52) U.S. Cl.
CPC ...... *H01M 8/04014* (2013.01); *H01M 8/04067* (2013.01); *H01M 8/04074* (2013.01); *H01M 8/248* (2013.01); *H01M 8/2415* (2013.01); *H01M 8/2475* (2013.01); *H01M 8/2485* (2013.01); *H01M 8/04089* (2013.01); *H01M 8/04164* (2013.01); *Y02E 60/50* (2013.01)

(58) Field of Classification Search
None
See application file for complete search history.

(56) References Cited

U.S. PATENT DOCUMENTS

| 4,212,929 | A | 7/1980 | Grevstad et al. |
|---|---|---|---|
| 5,612,149 | A | 3/1997 | Hartvigsen et al. |
| 5,721,064 | A | 2/1998 | Pedicini et al. |
| 5,853,909 | A | 12/1998 | Reiser |
| 6,391,485 | B1 | 5/2002 | Perry |
| 6,461,756 | B1 * | 10/2002 | Blanchet ............. H01M 8/2485 429/460 |

(Continued)

FOREIGN PATENT DOCUMENTS

| EP | 1777770 | 4/2007 |
|---|---|---|
| JP | S6158175 | 3/1989 |

(Continued)

OTHER PUBLICATIONS

International Preliminary Report on Patentability dated Nov. 4, 2014, issued in International Patent Application PCT/GB2013/051041.

(Continued)

*Primary Examiner* — Patrick Ryan
*Assistant Examiner* — Wyatt McConnell
(74) *Attorney, Agent, or Firm* — Baker Hostetler LLP; Mark H. Krietzman

(57) ABSTRACT

A fuel cell assembly comprising a plurality of fuel cell plates in a stack. The stack defines an air inlet face and/or an air outlet face; and two opposing engagement faces. The fuel cell assembly also comprises a detachable cover configured to releasably engage the two engagement faces in order to define an air chamber with the air inlet or outlet face.

18 Claims, 12 Drawing Sheets

(56) References Cited

U.S. PATENT DOCUMENTS

| | | | |
|---|---|---|---|
| 6,696,193 B2 * | 2/2004 | Bonk | H01M 8/2485 429/459 |
| 2006/0234106 A1 | 10/2006 | Duffield et al. | |
| 2007/0048574 A1 | 3/2007 | Aiello et al. | |
| 2011/0076588 A1 | 3/2011 | Yamaura | |

FOREIGN PATENT DOCUMENTS

| | | |
|---|---|---|
| JP | 2004-212827 | 7/2004 |
| WO | 99-27599 | 6/1999 |
| WO | 2006112833 | 10/2006 |
| WO | 2008-131078 | 10/2008 |

OTHER PUBLICATIONS

GB Search Report dated Mar. 12, 2013, issued in GB Patent Application GB1222166.9.

GB Search Report dated Jul. 31, 2012, issued in GB Patent Application GB1207582.6.

International Search Report and Written Opinion dated Nov. 4, 2013, issued in International Patent Application PCT/GB2013/051041.

* cited by examiner

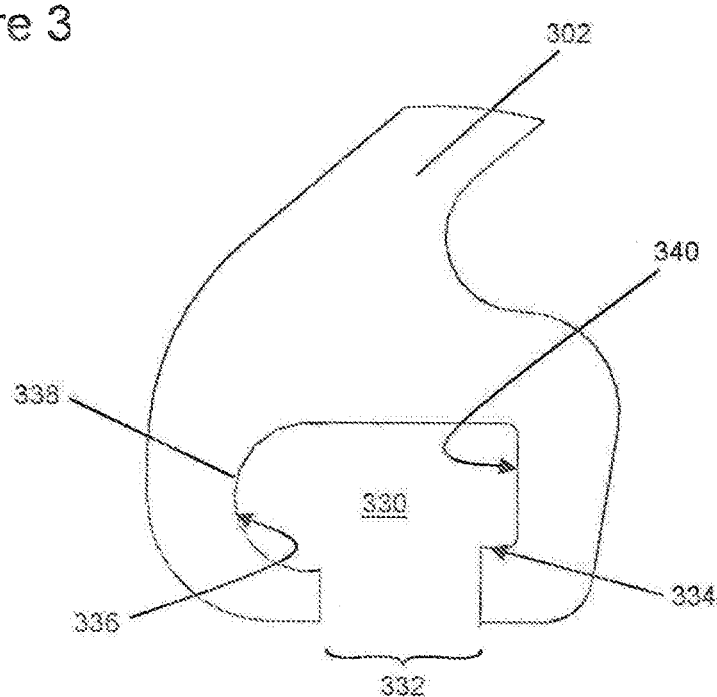

FUEL CELL ASSEMBLY

This patent application claims priority to International Patent Application PCT/GB2013/051041, filed Apr. 24, 2013, and United Kingdom Patent Application GB1207582.6, filed May 1, 2012, and United Kingdom Patent Application GB1222166.6, filed Dec. 10, 2012, the contents of which are incorporated by this reference as if fully set forth herein in their entirety.

The invention relates to fuel cell assemblies, in particular to enclosures for mounting open cathode fuel cell stacks.

Conventional electrochemical fuel cells convert fuel and oxidant, generally both in the form of gaseous streams, into electrical energy and a reaction product. A common type of electrochemical fuel cell for reacting hydrogen and oxygen comprises a polymeric ion (proton) transfer membrane, with fuel and air being passed over respective sides of the membrane. Protons (i.e. hydrogen ions) are conducted through the membrane, balanced by electrons conducted through a circuit connecting the anode and cathode of the fuel cell. To increase the available voltage, a stack may be formed comprising a number of such membranes arranged with separate anode and cathode fluid flow paths. Such a stack is typically in the form of a block comprising numerous individual fuel cell plates held together by end plates at either end of the stack.

Because the reaction of fuel and oxidant generates heat as well as electrical power, a fuel cell stack requires cooling once an operating temperature has been reached. Cooling may be achieved by forcing air through the cathode fluid flow paths. In an open cathode stack, the oxidant flow path and the coolant path are the same, i.e. forcing air through the stack both supplies oxidant to the cathodes and cools the stack.

Providing uniform air delivery to the cathode electrode surfaces within a fuel cell can be challenging when using compact assemblies. The use of plenum profiles and volumes may not be possible with tight volumetric packaging constraints.

According to a first aspect of the invention, there is provided a fuel cell assembly comprising:
 a plurality of fuel cell plates in a stack, the stack defining:
  an air inlet face and/or an air outlet face; and,
  two opposing engagement faces; and,
 a detachable cover configured to releasably engage the two engagement faces in order to define an air chamber with the air inlet or outlet face Providing the air chamber in this way can provide flexibility for conveniently providing different functionality associated with the detachable cover. For example, a tapering air chamber can be provided and/or one or more further components to be provided in the air chamber. In addition, coupling the cover to the engagement faces of the fuel cell plates, and not the air inlet face, can reduce or avoid any interference with air flowing into the air inlet face.

Use of the detachable cover can avoid the need for complicated pipe work that would otherwise be required for providing cathode air to ports in the stack of a closed cathode fuel cell.

The fuel cell assembly may further comprise two rods having a non-circular cross-section. Each rod may extend alongside one of the engagement faces and may be rotatable so as to releasably provide a seal between the detachable cover and the respective engagement face. The rods may be cam shaped in cross-section or circular with a flattened edge in cross-section. Using rods with a non-circular cross-section can enable the thickness of the rod that is located between the detachable cover and the engagement face to be changed when the rod is rotated. That is, the outward pressure applied by the rods to the detachable cover and engagement faces can be increased by rotating the rods, thereby improving the seal between the detachable cover and engagement faces.

The detachable cover may comprise recesses for receiving the rods. Providing the rods in recesses can improve the engagement between the detachable cover and the fuel cell plates, and can also reduce the likelihood of the detachable cover and the fuel cell plates becoming detached when they are engaged together.

The plurality of fuel cell plates may each comprise two projections, each projection associated with one of the two engagement faces. The detachable cover may be configured to releasably engage the projections. Providing such projections can enable the air chamber to be provided without significantly applying a force to an active region of the fuel cell plates.

The two projections may extend the engagement face beyond the air inlet or outlet face.

The two projections may be deformable in response to rotation of a rod. The projections may be elastomeric. Use of a deformable/elastomeric projection can improve the seal between the detachable cover and the fuel cell plates due to the resilient forces that result from the projections being compressed when the detachable cover engages the projections.

The detachable cover may comprise two recesses, each recess configured to receive one of the two rods and one of the two projections. The recesses may have a first inner surface for engaging the respective projection and a second inner surface for engaging the respective rod. Such recesses can improve the seal between the detachable cover and the projections by maintaining them in a fixed location relative to each other.

Each projection may comprise a projection lip. Each recess may comprise a recess lip. The projection lip may be configured to engage with the recess lip when the projection is located in the recess in order to restrict movement of the projection out of the recess.

The stack may comprise two end plates configured to engage with the detachable cover in order to define two opposing ends of the air chamber. Advantageously, end plates that can be used to compress the stack can also be used to define the air chamber.

The detachable cover may comprise an air chamber inlet and/or an air chamber outlet. The detachable cover may be configured to define the air chamber with a varying cross-sectional area as the air chamber extends towards or away from the air inlet or air outlet. The geometry of such an air chamber can be designed so as to improve the performance of the fuel cell stack, for example by providing air with a generally uniform pressure to each of the fuel cell plates.

The detachable cover may be a first detachable cover configured to define an air chamber with the air inlet face. The fuel cell assembly may further comprise a second detachable cover configured to releasably engage two engagement faces in order to define an air chamber with the air outlet face. It will be appreciated that any of the features of a detachable cover disclosed herein can apply to either or both of the first and second detachable covers.

The fuel cell assembly may further comprise a heat exchanger in fluid communication with the air chamber. The heat exchanger may be attached directly to the cover.

There may be provided a plurality of fuel cell assemblies as described herein. The detachable covers of each of the fuel cell assemblies may be in fluid communication with at least one detachable cover of another fuel cell assembly. In this way, the fuel cell assemblies can be considered as modular.

According to a further aspect of the invention, there is provided a fuel cell assembly, comprising:
- a plurality of fuel cell plates in a stack, the stack comprising a ventilation face;
- an air chamber cover configured to define an air chamber with the ventilation face; and,
- a heat exchanger in fluid communication with the air chamber.

The air chamber cover can provide a convenient mechanism for coupling air from the fuel cell stack to the heat exchanger.

The heat exchanger may be a condenser.

The ventilation face may be an air outlet face. The condenser may be configured to remove water from air received from the air chamber. In this way, the condenser can provide a source of highly pure water from air received from the fuel cell stack.

The fuel cell assembly may be configured to transport the removed water to the fuel cell stack for hydration or cooling.

The air chamber cover may be directly coupled to the heat exchanger. This can avoid complicated pipe work and seals to couple the two together.

The air chamber cover may have one or more apertures for providing air from the air chamber to the heat exchanger. The one or more apertures may be oriented in a plane that is transverse to the ventilation face with which the air chamber cover is associated.

The heat exchanger may have one or more inlet openings that correspond with the one or more apertures in the air chamber cover. The one or more inlet openings and one or more apertures may be located adjacent to each other.

A face of the air chamber cover in which the one or more apertures are located may directly abut a face of the heat exchanger in which the one or more inlet openings are located.

The face of the air chamber cover in which the one or more apertures are located may have a larger or smaller area than the ventilation face with which it is associated, which can enable the air flow through the heat exchanger to be increased or decreased.

The air chamber cover and the heat exchanger may be integrally formed as a single component.

The stack may also define two opposing engagement faces. The air chamber cover may be a detachable cover configured to releasably engage the two engagement faces in order to define the air chamber with the ventilation face.

The fuel cell stack may be an air-cooled fuel cell stack.

It will be appreciated that each of the above features is equally applicable to other fuel cell assemblies and aspects of the invention disclosed herein.

According to a further aspect of the invention, there is provided a method of assembling a fuel cell stack assembly, the method comprising:
- aligning a plurality of fuel cell plates, the fuel cell plates each having an air inlet face and/or an air outlet face and two opposing engagement faces;
- placing a detachable cover over the air inlet face or outlet face of the fuel cell plates; and,
- releasably engaging the detachable cover with the engagement faces of the fuel cell plates, thereby defining an air chamber between the air inlet face or outlet face and the detachable cover.

According to a further aspect of the invention, there is provided a method of assembling a fuel cell stack assembly, the method comprising:
- aligning a plurality of fuel cell plates with an end plate at each end, the fuel cell plates each having an air inlet face and/or an air outlet face and two opposing engagement faces;
- placing a detachable cover over the air inlet face or outlet face of the fuel cell plates;
- compressing the plurality of fuel cell plates together such that the end plates engage with the detachable cover;
- inserting rods between the detachable cover and the engagement faces, the rods having a non-circular cross-section; and,
- rotating the rods in order to releasably engage the detachable cover and the engagement faces, thereby defining an air chamber between the air inlet face or air outlet face, the detachable cover and the end plates.

The invention will now be described by way of example, and with reference to the accompanying drawings in which:

FIG. 3 shows a similar cross-sectional view of the detachable cover that is shown in FIGS. 2a and 2b;

Embodiments disclosed herein relate to a fuel cell assembly comprising a plurality of fuel cell plates in a stack. The stack defines an air inlet face and two opposing engagement faces, which may be side faces. The fuel cell assembly also includes a detachable cover that can releasably engage the two engagement faces in order to define an air chamber with the air inlet face of the stack. The detachable cover can be considered as providing an air box. Such embodiments can be considered as attaching and sealing an air box to a fuel cell assembly and terminating the air box at the end plates.

Providing the air chamber in this way can provide flexibility for providing different functionality of the detachable cover, such as by enabling a tapering air chamber to be easily provided and/or one or more further components to be provided in the air chamber. In addition, coupling the cover to the engagement faces of the fuel cell plates, and not the air inlet face, can reduce or avoid any interference with air flowing into the air inlet face.

Figure 1:
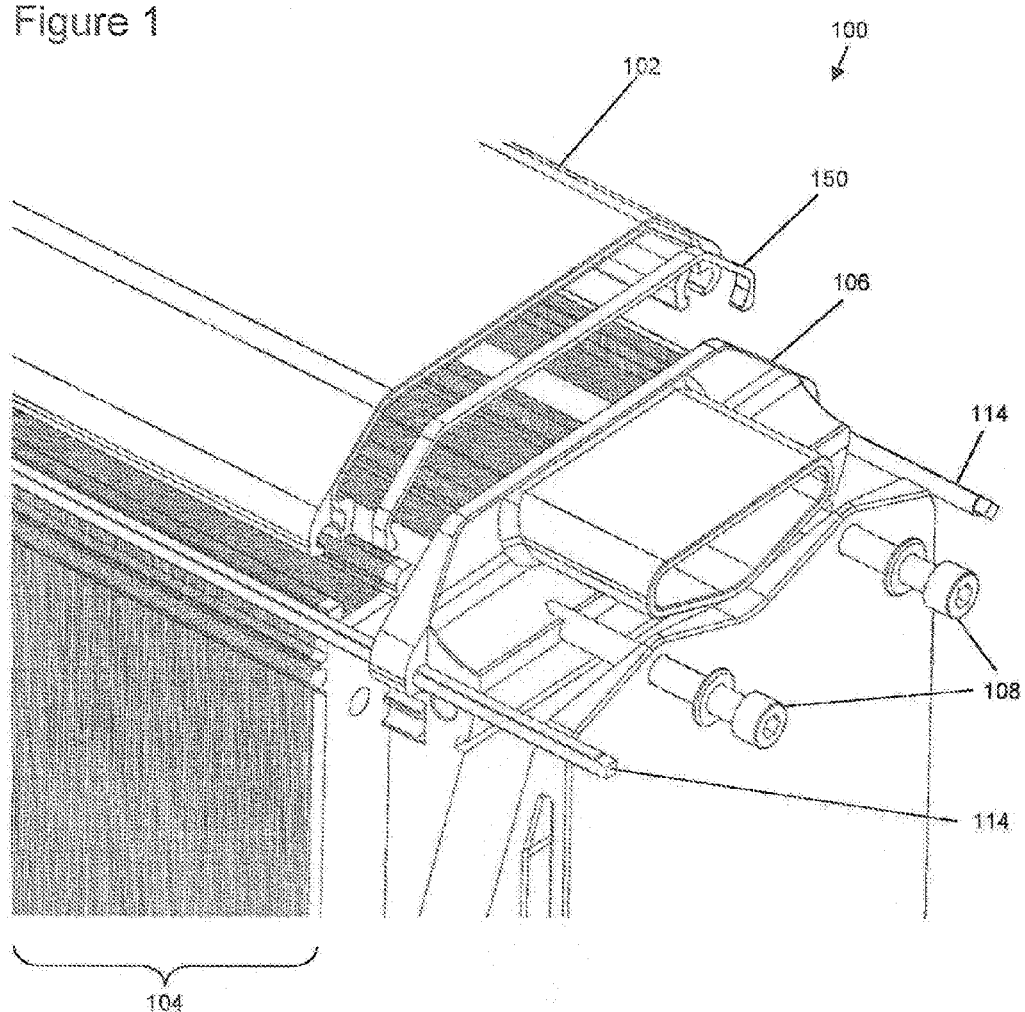
FIG. 1 shows an exploded view of a fuel cell assembly according to an embodiment of the invention.

FIG. 1 shows an exploded view of a fuel cell assembly 100 according to an embodiment of the invention. The fuel cell assembly 100 includes a plurality of fuel cell plates 104 that can be compressed together to form a stack. The top surface of each plate 104 shown in FIG. 1 has air inlet openings for receiving cathode air. When the plates 104 are compressed together, these top surfaces will be referred to together as an inlet face of the stack. The side surfaces of the plates 104 shown in FIG. 1 do not receive or exhaust any fluids. When the plates 104 are compressed together, these side surfaces will be referred to together as engagement faces of the stack.

FIG. 1 also shows a detachable cover 102 that can releasably engage the two engagement faces of the stack in order to define an air chamber with the air inlet face of the stack. In this way, air, or any other fluid, that is provided to the air chamber is provided to the air inlet openings of each of the fuel cell plates 104.

At each end of the stack is an end plate 106. Only one end plate 106 is shown in FIG. 1. The end plates 106 are used to compress the fuel cell plates 104 together and hold the stack together using tie rods 108. In this embodiment, the end plates 106 are also used to define end walls of the air chamber.

Two rods 114 that extend alongside the engagement surfaces of the stack when the fuel cell assembly 100 is assembled are also shown in FIG. 1. The rods 114 are used for engaging the detachable cover 102 with the plates 104 in this example. Further details are provided below with reference to FIGS. 2a and 2b.

Figure 2A:
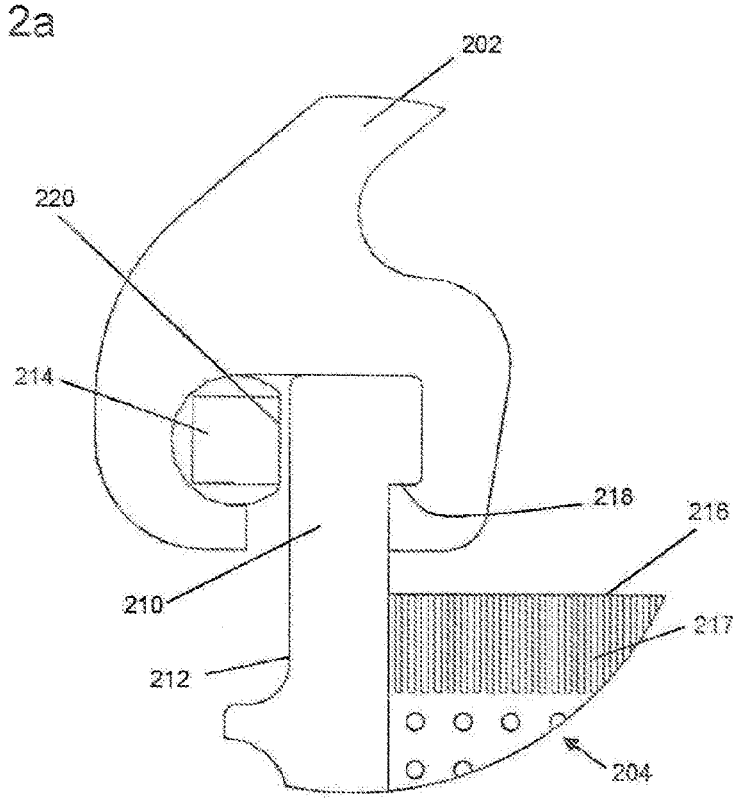
FIGS. 2a and 2b show in cross-section the engagement between one side of a detachable cover and a fuel cell plate according to an embodiment of the invention.
Figure 2B:
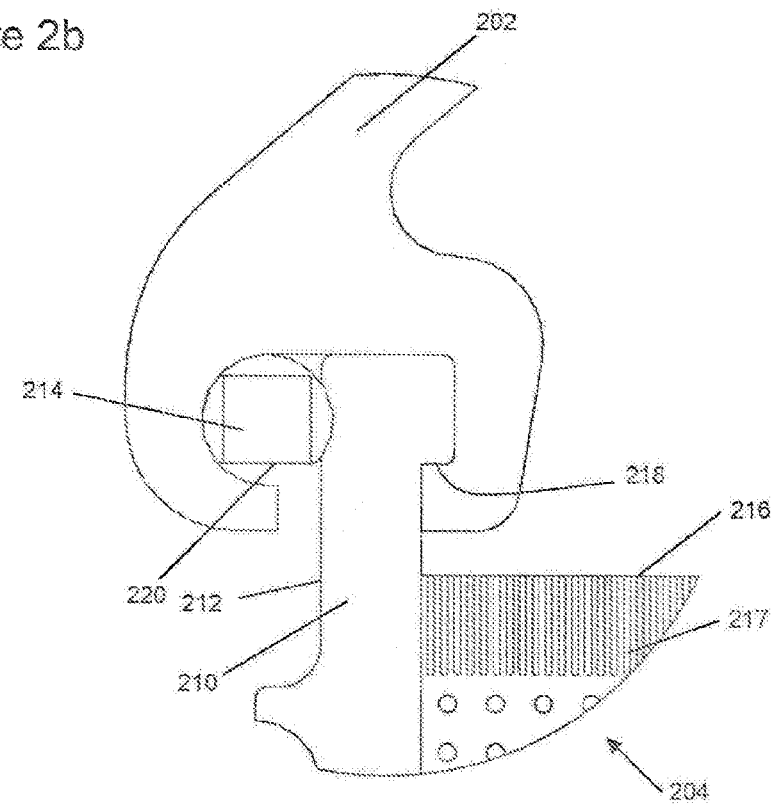

FIGS. 2a and 2b show in cross-section the engagement between one side of the detachable cover 202 and a fuel cell plate 204 in more detail. It will be appreciated that the other side of the detachable cover 202 can engage the fuel cell plate 204 in a similar way. FIG. 2a shows the detachable cover 202 located in an in-use position with the fuel cell plate 204, but not engaged with the fuel cell plate. FIG. 2b shows the detachable cover 202 engaged with the fuel cell plate 204.

Channels 217 extending away from the air inlet face 216 are shown in FIGS. 2a and 2b as example air inlet openings.

In this example, the fuel cell plate 204 includes a longitudinal projection 210 that extends the engagement surface 212 beyond the air inlet face 216 of the plate 204. The longitudinal projection 210 also includes a laterally extending projection lip 218 for engaging with the detachable cover 202 as described below. In this implementation, the projection 210 is made from a deformable material such as an elastomeric material, for example, rubber.

A rod 214 is shown extending alongside the outside of the projection 210. The rod 214 has a non-circular cross-section, that is, a cross-section having at least two different radii, which in this example is circular with a flattened edge 220. The flattened edge 220 represents smaller cross-sectional radii than the circular region of the cross-section.

When the detachable cover 202 is located around the projection 210 in an unengaged state as shown in FIG. 2a, the flattened edge 220 of the rod 214 faces toward the projection 210. As will be discussed below, in some embodiments the detachable cover 202 can be placed over the projections 210 before the rod 214 is inserted along the length of the stack (into or out of the plane of the drawing in FIGS. 2a and 2b). As the flattened edge 220 faces the projection 210, the rod 214 can be inserted without experiencing interference from the projection 210 that would prevent the rod from being inserted.

In order to releasably engage the detachable cover 202 with the projection 210, the rod 214 may be rotated such that a region of the rod 214 with a circular cross-section engages with the projection 210. This is shown in FIG. 2b. More generally, the rod 214 is rotatable such that a region of the rod 214 with a larger cross-sectional radius faces towards, and engages with, the projection 210.

An alternative may be that the fuel cell plate 204 includes a longitudinal projection 210 that extends the engagement surface 212 beyond the air inlet face 216 of the plate 204. The longitudinal projection 210 in this alternative includes a projection lip laterally extending away from the outside of the fuel cell stack for engaging with the detachable cover 202 via an outer recess of the cover. A rod 214 with a non-circular cross-section would then extend alongside the inside of the projection 210 for engagement of the cover with the projection of the fuel cell plate. In this alternative the rods and projection lips also interact with opposing engagement surfaces of the detachable cover.

In both of these embodiments, the projection 210 is made from rubber and deforms when the rod 214 is rotated to engage with the projection 210. This can improve the seal between the detachable cover 202 and the plate 204. It has been found that providing a seal in this way at the air inlet can provide a 99.9% effective seal for typical air pressures in such a closed cathode fuel cell. In some examples, a liquid sealant can be provided between two or more of the detachable cover 202, projection 210 and rod 214 in order to further improve the quality of the seal.

The use of a non-circular rod 214 can be considered as applying a cam principal in order to hydraulically engage, or lock (in the sense that the projections 210 are hydraulically compressed) the molded projections 210 from a series of fuel cell plates 204 into a contoured receiving groove within the detachable cover.

In order to disengage the cover 202 from the plates 204, the above procedure may be simply reversed. That is, the rods 214 may be rotated such that the flattened edge 220 faces toward the projection 210 (as shown in FIG. 2a). Optionally the rod 214 is longitudinally removed from the assembly, and then the detachable cover 202 is lifted off the plates 204. In embodiments where a liquid sealant is used, this can simply be peeled away from the cover 202 so that the cover 202 can be reused.

FIG. 3 shows a similar cross-sectional view of the detachable cover 302 to that shown in FIGS. 2a and 2b. FIG. 3 will be used to describe various surfaces of the detachable cover 302 that engage with the rod or projection shown in FIG. 2.

The portion of the detachable cover 302 that is shown in FIG. 3 may be considered as an engagement region of the detachable cover 302. The engagement region has a recess 330 that receives the rod and projection of the fuel cell plate (not shown in FIG. 3). The recess 330 has an opening 332, through which the projection is passed when the detachable cover 302 is placed over the inlet face of the stack. The recess is bound by a first inner surface 340 of the detachable cover 302 for engaging with the projection and a second inner surface 336 of the detachable cover 302 for engaging with the rod. In some circumstances, the detachable cover 302 may be deformable so as to align the recesses 332 on each side of the cover 302 with the projections on each side of the stack.

The recess 330 is defined so as to provide a laterally extending internal surface, which will be referred to as a recess lip 334, for engaging with a corresponding projection lip of the projection (as shown with reference 218 in FIG. 2a.) The engagement of these two lips can reduce the likelihood of the cover 302 becoming detached from the projection while the fuel cell stack is in use.

The recess 330 is also shaped so that the second inner surface 336 of the detachable cover 302 defines a sub-recess 338 for receiving the rod (not shown). The rod may be located in the sub-recess 338 before the cover 302 is placed over the projections, or the rod may be inserted longitudinally into the sub-recess 338 after the projections have been located in the recess 330.

It will be appreciated that when the rod is rotated to an engagement position, the rod effects an outward force from the rod against the second inner surface 336 of the detachable cover that bounds the sub-recess 338, and also an outward force against the projection. In turn, the force applied to the projection increases the force applied to the first inner surface 340 by the projection. In this way, a seal is provided between the detachable cover and the fuel cell plates.

It will be appreciated that the projections 210 described above with reference to FIG. 2 need not necessarily extend beyond the air inlet face of each fuel cell plate. In other examples, projections could extend laterally away from the engagement surfaces of the fuel cell plates. Optionally, such laterally extending projections could also extend in a direction towards, or away from, the air inlet face of the fuel cell plates. Projections could be provided in numerous different ways whilst still providing engagement surfaces to releasably engage with the detachable cover.

In some embodiments, projections may not be required at all; the detachable cover may engage directly with side faces of the fuel cell plates. That is, the side faces of the fuel cell plates may be considered as engagement faces.

Figure 4A:
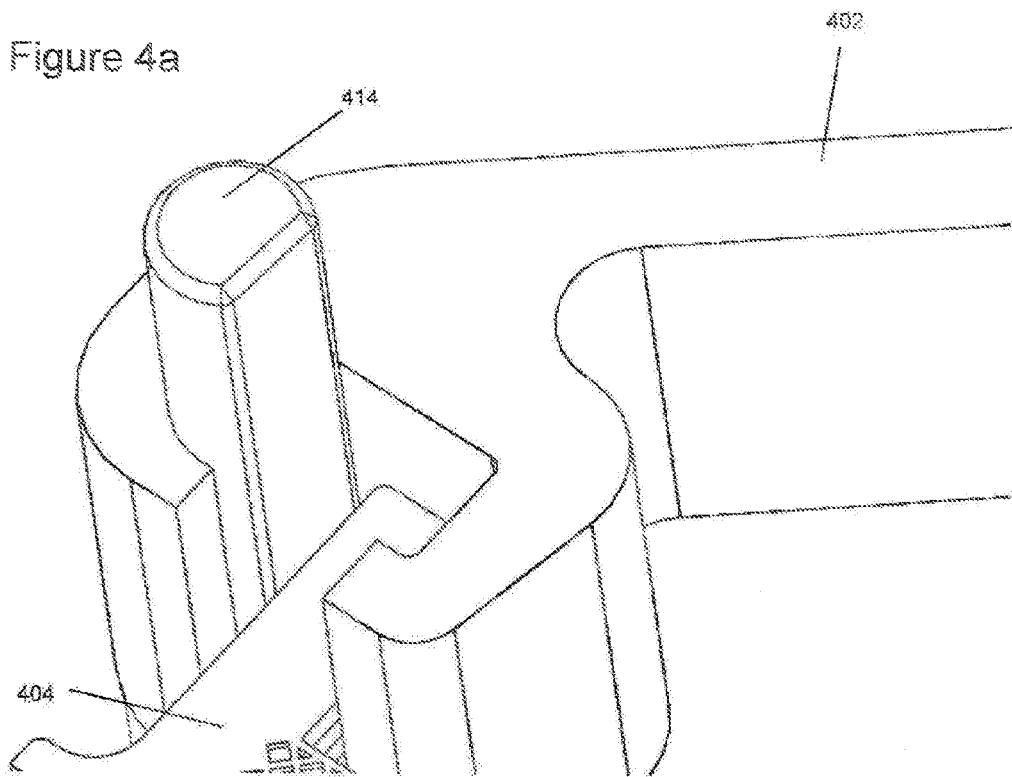
FIGS. 4a and 4b illustrate in three dimensions the engagement of a detachable cover with a fuel cell plate according to an embodiment of the invention.
Figure 4B:
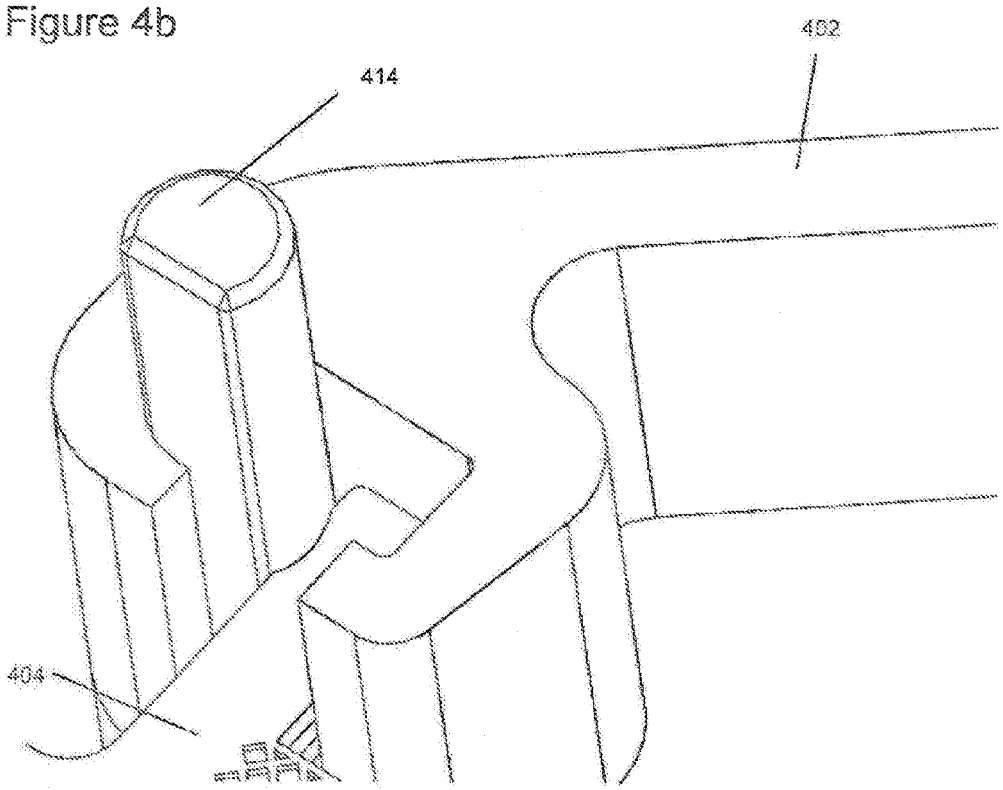

FIGS. 4a and 4b illustrate in three dimensions the engagement of a detachable cover 402 with a fuel cell plate 404 according to an embodiment of the invention. The engagement uses a rod 414, only part of which is shown in FIGS. 4a and 4b, that is similar to the rod shown in FIGS. 2a and 2b. FIGS. 4a and 4b show the rod 414 in a disengaged and engaged position respectively.

Figure 5:
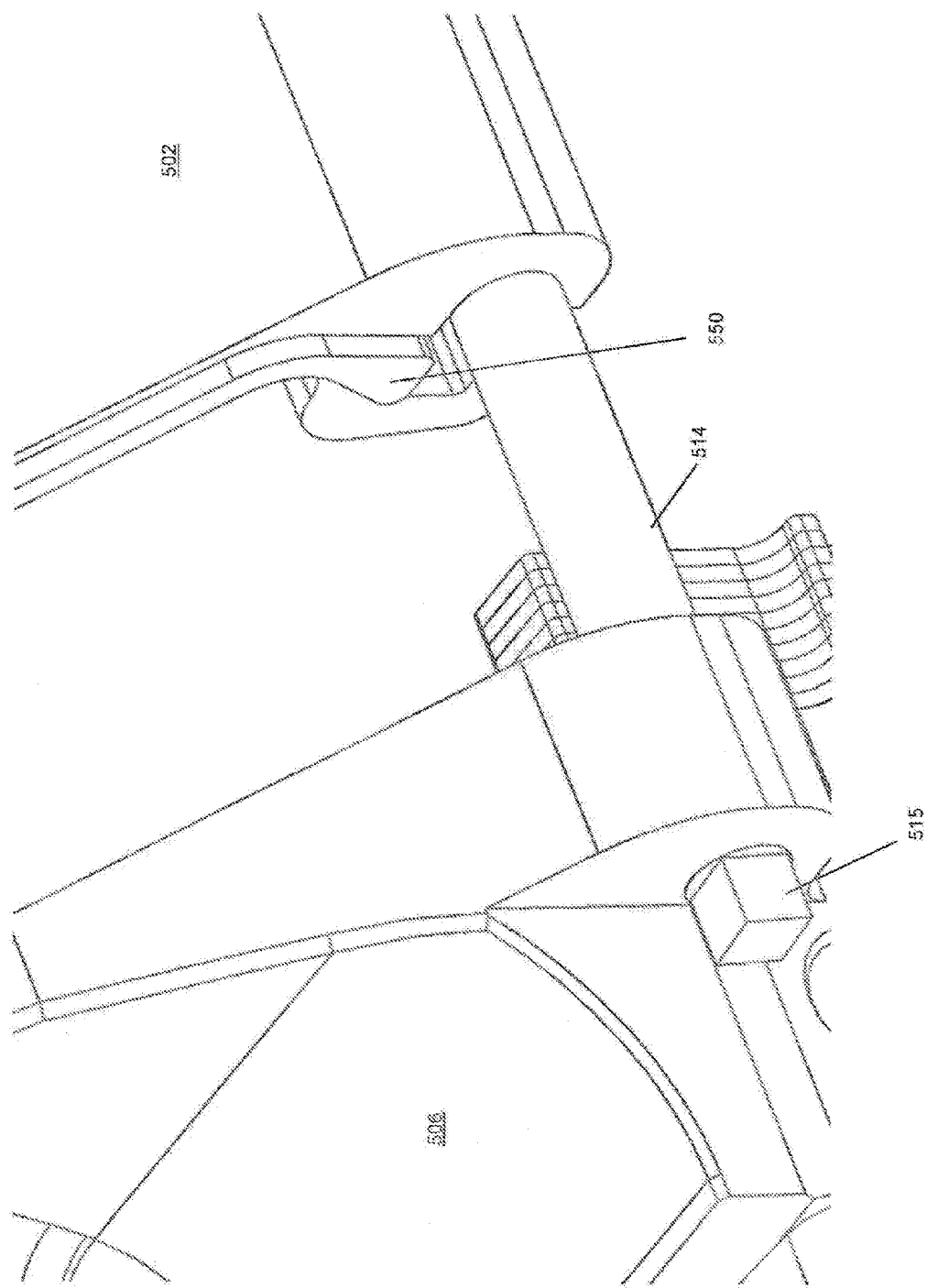
FIG. 5 shows the end of a fuel cell assembly according to an embodiment of the invention.

FIG. 5 shows the end of a fuel cell assembly according to an embodiment of the invention. FIG. 5 will be used to describe in more detail the binding of the air chamber by the end plates 506, which is briefly mentioned above with reference to FIG. 1.

FIG. 5 shows a single end plate 506. It will be appreciated that a second end plate is also provided at the other end of the stack of fuel cell plates.

A front (or back) surface of the end plate 506 engages with an end surface of the detachable cover 502. With such an arrangement, the detachable cover 502 is placed over the rods 514 and fuel cell plates, between the two end plates 506, before the stack is compressed to its working dimension. When the stack is compressed to its working dimension the end plates abut the detachable cover to define two opposing ends of the air chamber. In this example a deformable seal 550 is provided between the end plate 506 and the detachable cover 502. A corresponding seal 150 is shown in the exploded view of FIG. 1. A groove may be provided in the end plate 506 and/or detachable cover 502 for receiving the seal 550, thereby holding the seal 550 in position.

FIG. 5 also shows the rod 514 protruding through the end plate 506 and terminating with a series of flat sides 515. The flat sides 515 provide a convenient means for rotating the rod 514.

The above description refers to releasably attaching a cover at an air inlet end of the fuel cell plates. It will be appreciated that a similar cover can be releasably attached to an air outlet end of the fuel cell plates.

Figure 6:
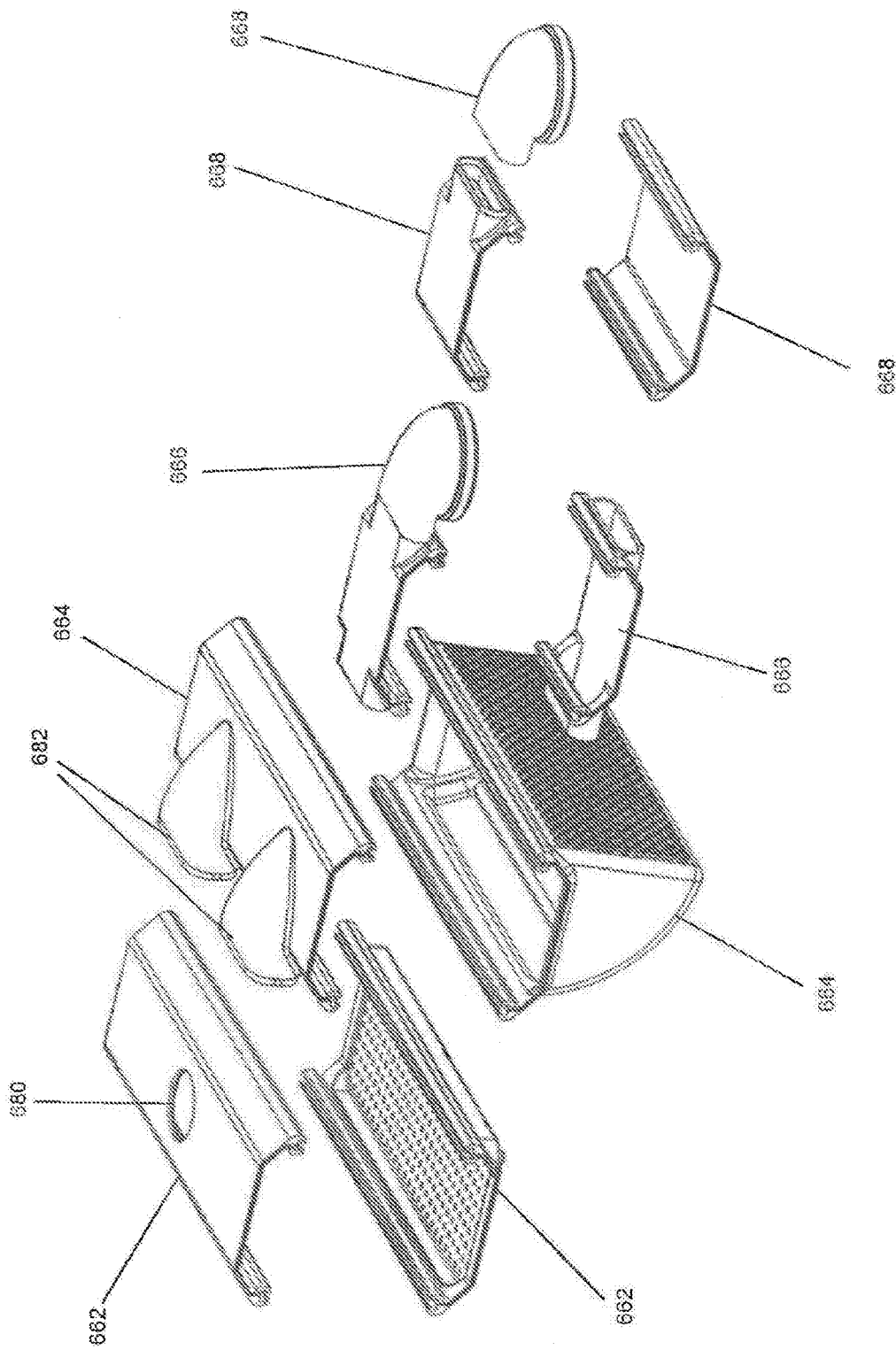
FIG. 6 shows example detachable covers that can be used with embodiments of the invention.

FIG. 6 shows example detachable covers that can be used with embodiments of the invention. FIG. 6 shows four sets of detachable covers 662, 664, 666, 668, with each set consisting of a cover for an air inlet to the stack and a cover for an air outlet of the stack. The first two sets of covers 662, 664 are for use with longer stacks than the second two sets of covers 666, 668. Embodiments of the invention are not restricted to fuel cell stacks with specific dimensions.

The different covers that are shown in FIG. 6 illustrate how parameters of the air chamber, including the introduction of additional functionality, can be readily and conveniently adjusted simply by replacing the cover. For example, a single opening 680 into the inlet air chamber is provided by the first inlet cover 662, whereas the second inlet cover 664 has a twin blower inlet 682. The second outlet cover 664 can be dimensioned so as to provide an exhaust box with a heat exchanger.

Figure 7A:
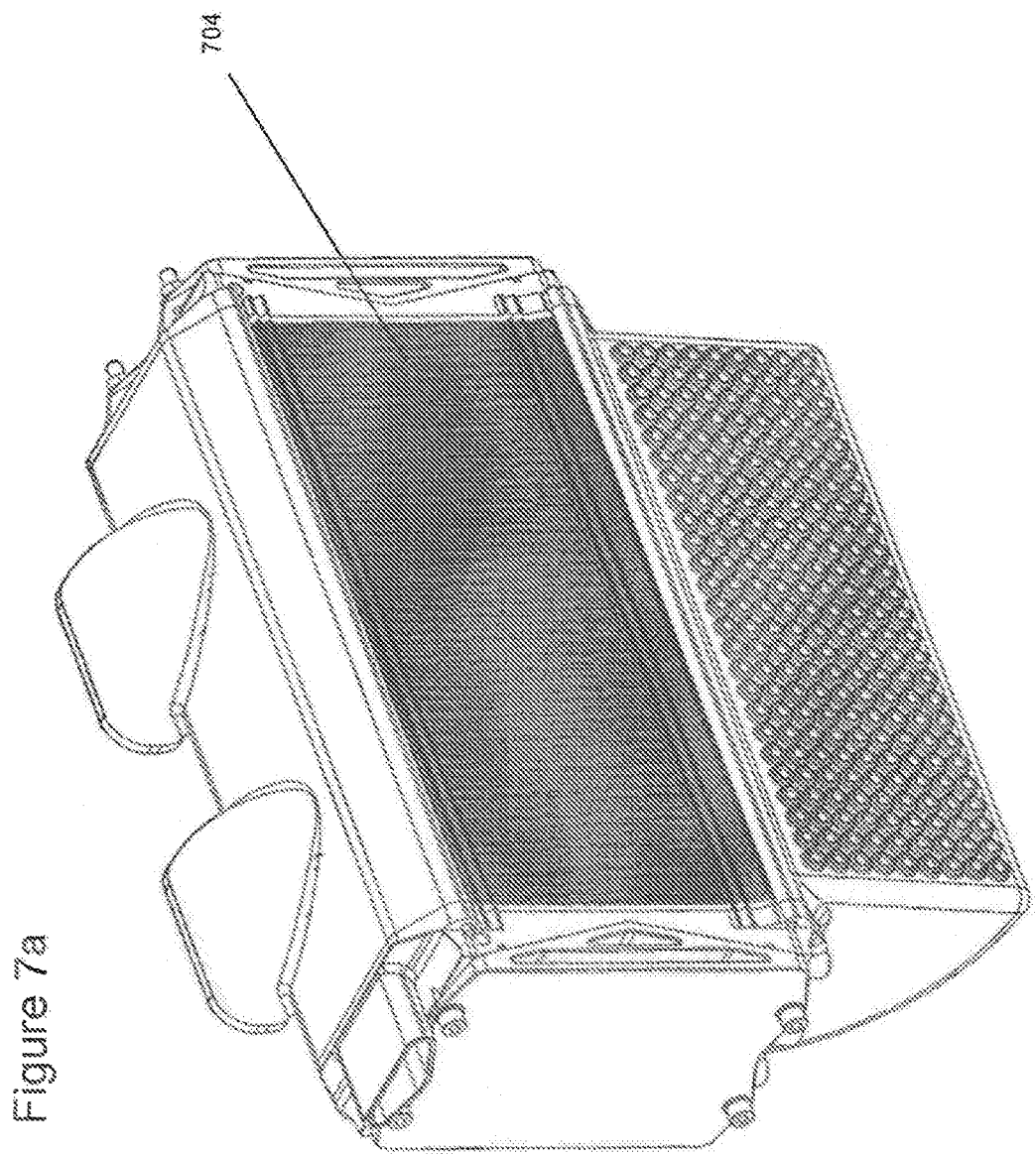
FIG. 7a shows the second inlet and outlet covers of FIG. 6 engaged with a fuel cell stack.

FIG. 7a shows the second inlet and outlet covers 664 of FIG. 6 engaged with a fuel cell stack 704.

Figure 7B:
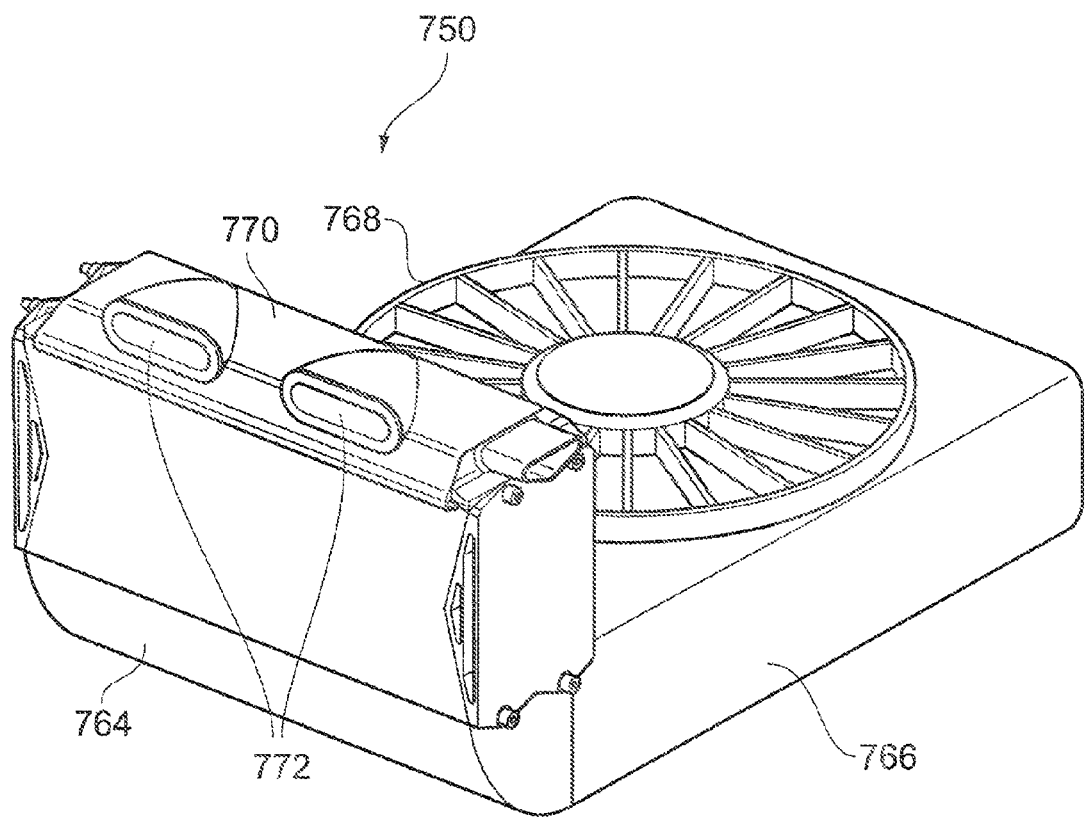
FIG. 7b shows another fuel cell assembly.

FIG. 7b illustrates a fuel cell assembly 750 comprising a fuel cell stack. A first air chamber cover 770 extends over an air inlet face of the fuel cell stack, which is the top face of the fuel cell stack in FIG. 7b. The first air chamber cover 770 defines an air inlet chamber with the air inlet face. The first air chamber cover 770 has two air inlet ports 772 that can receive pressurised air from a fan or blower, for example. Air is fed into the fuel cell stack from the air inlet chamber.

A second air chamber cover 764 defines an air outlet chamber with an air outlet face of the fuel cell stack. The air outlet chamber is in fluid communication with the air inlet chamber through the fuel cell stack. In this example, the fuel cell stack is air-cooled. Air passing from the air inlet chamber to the air outlet chamber is used to cool the fuel cells in the stack.

The air inlet face and air outlet face of the fuel cell stack are examples of ventilation faces.

The second air chamber cover 764 has an aperture that is in fluid communication with an inlet face of a heat exchanger 766 such as a condenser. In this way, the heat exchanger 766 is in fluid communication with the air outlet chamber.

The heat exchanger 766 in this example is air-cooled and has a fan 768 that draws air over the heat exchanger 766 in order to cool the air received from the air outlet chamber. In other examples, the heat exchanger 766 can be liquid cooled or of any other known type.

The second air chamber cover 764 may be similar to the second outlet cover shown in FIGS. 6 and 7a. That is, the second air chamber cover 764 may have a plurality of apertures that correspond with inlet openings of the heat exchanger 766. In this example, the second air chamber cover 764 is directly coupled to the heat exchanger 766 as the plurality of apertures in the second air chamber cover 764 directly interface with the inlet openings of the heat exchanger 766. No pipe work may be required to connect the air outlet chamber to the heat exchanger 766 as the face of the second air chamber cover 764 in which the apertures are located directly abuts the face of the heat exchanger 766 in which the inlet openings are located.

The second air chamber cover 764 and the heat exchanger 766 may be considered as modular components that can be directly coupled together. In other examples, the second air chamber cover 764 and the heat exchanger 766 may be integrally formed as a single component.

The second air chamber cover 764 can provide a convenient mechanism for coupling air from the fuel cell stack to a condenser 766 such that highly pure water from the air can be retrieved for re-use by the fuel cell stack.

In this example, first and/or second air chamber covers 770, 764 need not necessarily engage with opposing engagement faces of the fuel cell stack. For example, the air chamber covers 770, 764 may be attached directly to the air inlet/outlet faces by an adhesive.

In this example of FIG. 7b, the inlet face of the heat exchanger 766 is disposed transversely with respect to the air outlet face 766 of the fuel cell stack. The apertures in the second air chamber cover 764 are oriented in a plane that is transverse to the air outlet face 766 of the fuel cell stack. Therefore, the second air chamber cover 764 can be considered as receiving air from the fuel cell stack in a first direction (vertically downwards in FIG. 7b) and providing air to the heat exchanger 766 in a second direction (horizontally to the right in FIG. 7b) that is transverse to the first direction. It will be appreciated that in other examples the second direction can be in any orientation relative to the first direction, including generally parallel.

The condenser 766 cools the air received from the air outlet chamber such that condensed water is removed from the received air. The condensed water can be used to rehydrate the fuel cell stack or to cool the fuel cell stack. In one example, pipes and a pump are used to transport the condensed water from the condenser 766 to an appropriate part of the fuel cell stack.

The condensed water is likely of high purity because it has been generated by the fuel cell stack during the combination of hydrogen and oxygen at the membrane electrode assembly (MEA). Such a high purity water supply can be particularly advantageous in applications where pure water is not otherwise available, for example on-board a vehicle.

The water obtained by the condenser 766 can be fed back to the fuel cell stack anodes and/or cathodes, where it is used to perform one or more functions useful for maintaining optimum operating conditions within the fuel cell stack. For example, the water may be warm, which is useful for pre-heating fuel and/or oxidant. The water by-product of the fuel cell stack does not constitute a significant risk of poisoning or otherwise compromising the performance of the MEA in the fuel cell stack.

The water may be used to humidify the inlet fuel and/or oxidant stream, again assisting in maintaining an appropriate level of reaction rate at the MEAs of the fuel cell stack and prolonging the life of the membrane. The water may alternatively be injected directly into fluid flow field plate channels of the fuel cell stack, on the anode side and/or on the cathode side, where it may assist in one or more of: temperature control of the MEA by re-evaporation; humidification of the membrane; and pre-heating of the fuel and/or oxidant.

Figure 8A:
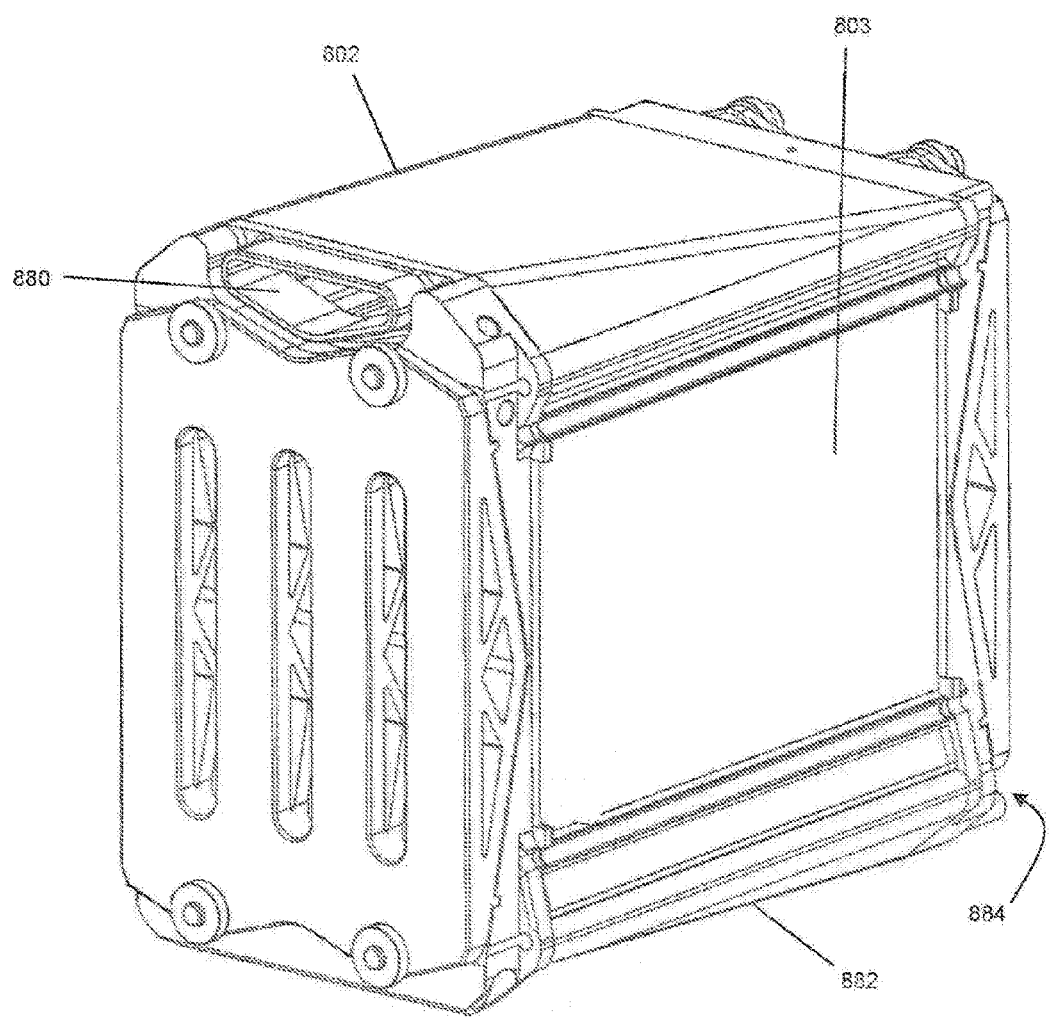
FIGS. 8a and 8b show a three dimensional view and a cross-section along the length of a stack for an air inlet detachable cover according to an embodiment of the invention.
Figure 8B:
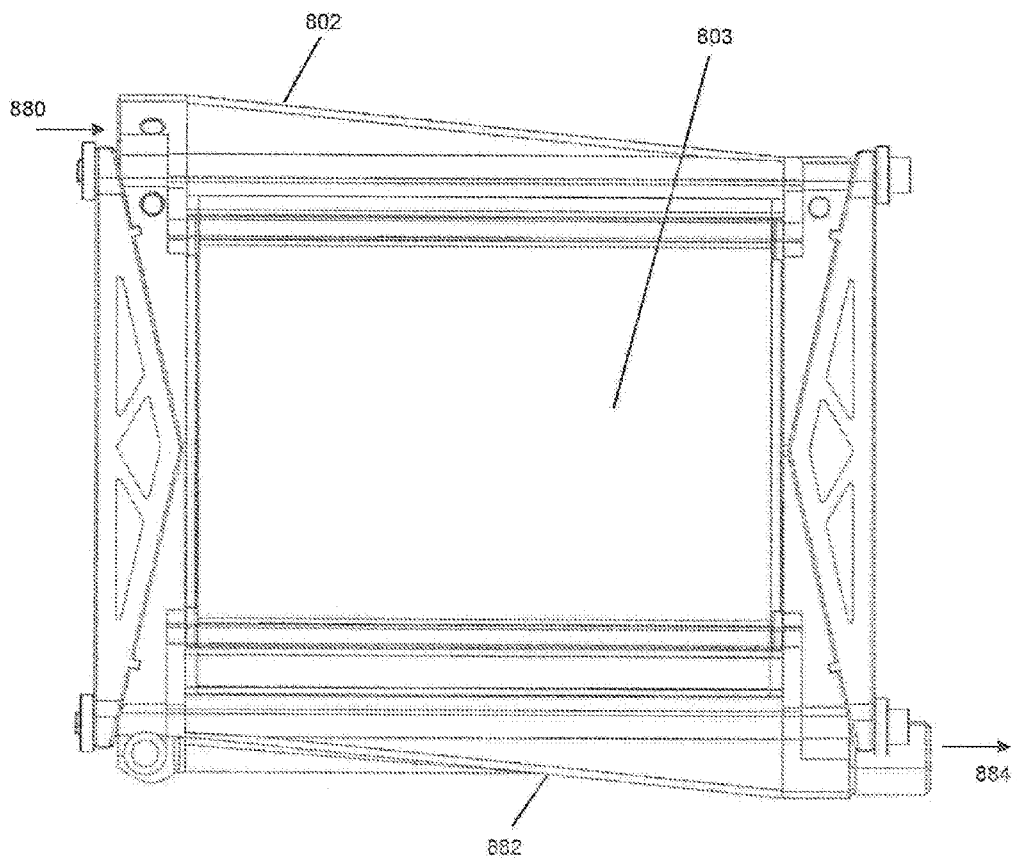

FIGS. 8a and 8b show a three dimensional view and a cross-section along the length of the stack 803 for an alternative air inlet detachable cover 802 engaged with an air inlet of fuel cell stack 803. The detachable cover 802 defines an air inlet chamber with a tapering cross-sectional area that becomes progressively smaller as the air inlet chamber extends from an air chamber inlet 880. An air outlet detachable cover 882 is also shown engaged with an air outlet of the fuel cell stack 803. The air outlet detachable cover 882 defines an air outlet chamber with a tapering cross-section that gets progressively larger as the air outlet chamber extends towards an air chamber outlet 884.

Such tapering volumes can improve the uniformity of the air pressure that is provided to each of the fuel cell plates in the stack. Furthermore, having both a tapering air inlet chamber and an air outlet chamber can promote uniform air velocity in both boxes, thus aiding cell balance.

Figure 9:
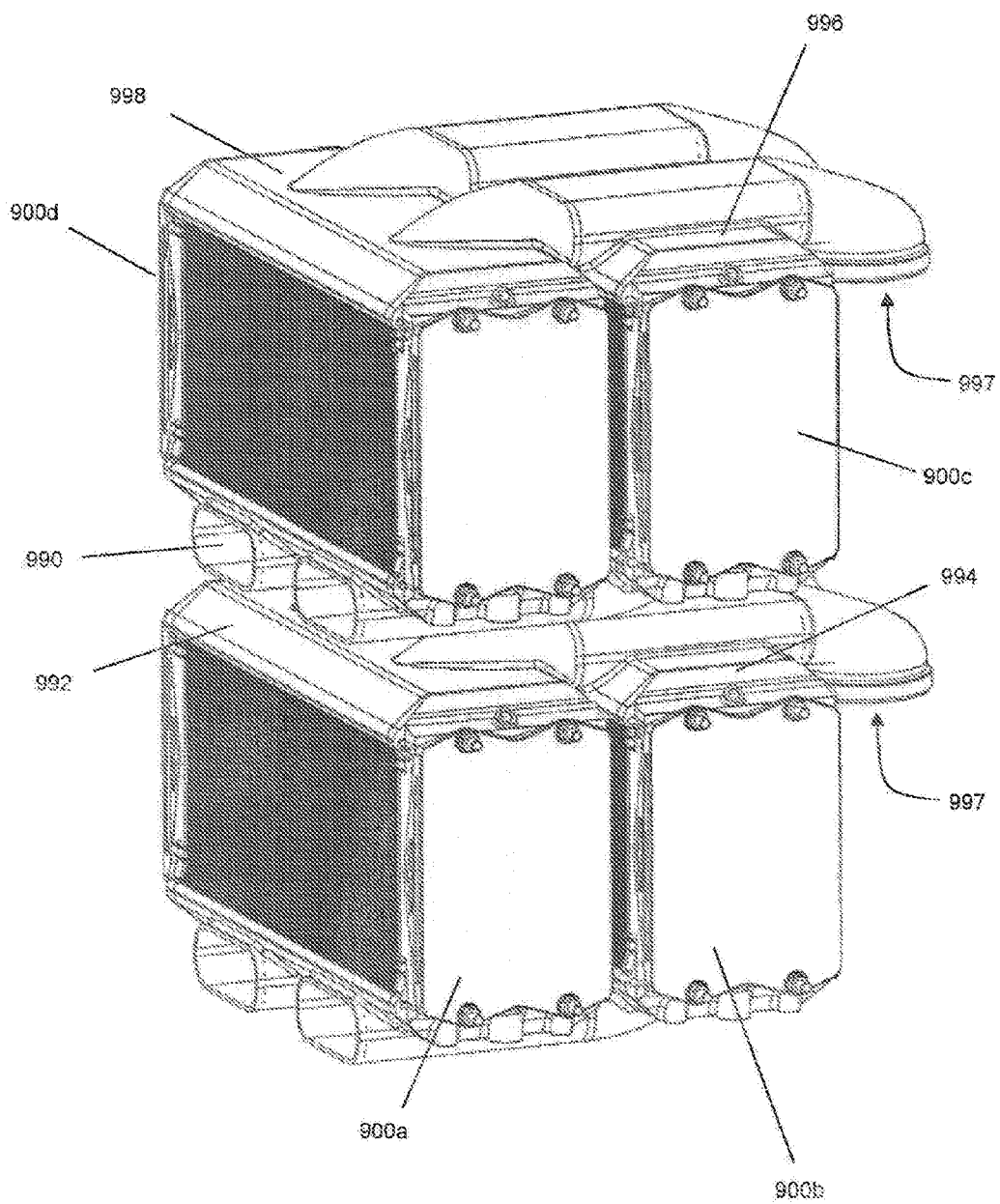
FIG. 9 shows four fuel cell assemblies according to an embodiment of the invention; and, FIG. 10 illustrates a method of assembling a fuel cell assembly according to an embodiment of the invention.

FIG. 9 shows four fuel cell assemblies 900a-d according to an embodiment of the invention.

The fuel cell assemblies 900a-d of FIG. 9 can be combined with each other in a modular fashion. It can be seen that the assemblies 900a-d can be located side-by-side or on top of each other and connected together through use of detachable covers that are in fluid communication with at least one other detachable cover. The assemblies 900a-d in FIG. 9 are series linked stacks in a twin parallel system.

The example of FIG. 9 includes a single air inlet 990 for all of the assemblies 900a-d. The air inlet 990 is provided in a first detachable cover 992 associated with a first assembly 900a. The first detachable cover 992 has an air outlet that is in fluid connection with an air inlet of a second detachable cover 994 associated with a second assembly 900b. Similarly, the second detachable cover 994 is in fluid connection with a third detachable cover 996, and the third detachable cover 996 is in fluid connection with a fourth detachable cover 998. The dimensions of each of the covers 992, 994, 996, 998 can be set so as to provide the desired air pressure at the air inlet faces of each of the fuel cell stacks 900a, 900b, 900c, 900d.

The detachable covers 994, 996 of the second and third assemblies 900b, 900c are shown in this example with points of attachment 997, which can be connected to a compressor in some examples to pressurise the air in the detachable covers.

It will be appreciated that any number of fuel cell assemblies can be connected together in this way, in any orientation, and can be connected together through use of appropriate detachable covers.

It will also be appreciated that the air outlets of the fuel stacks could additionally/alternatively be connected together in a similar way.

Figure 10:
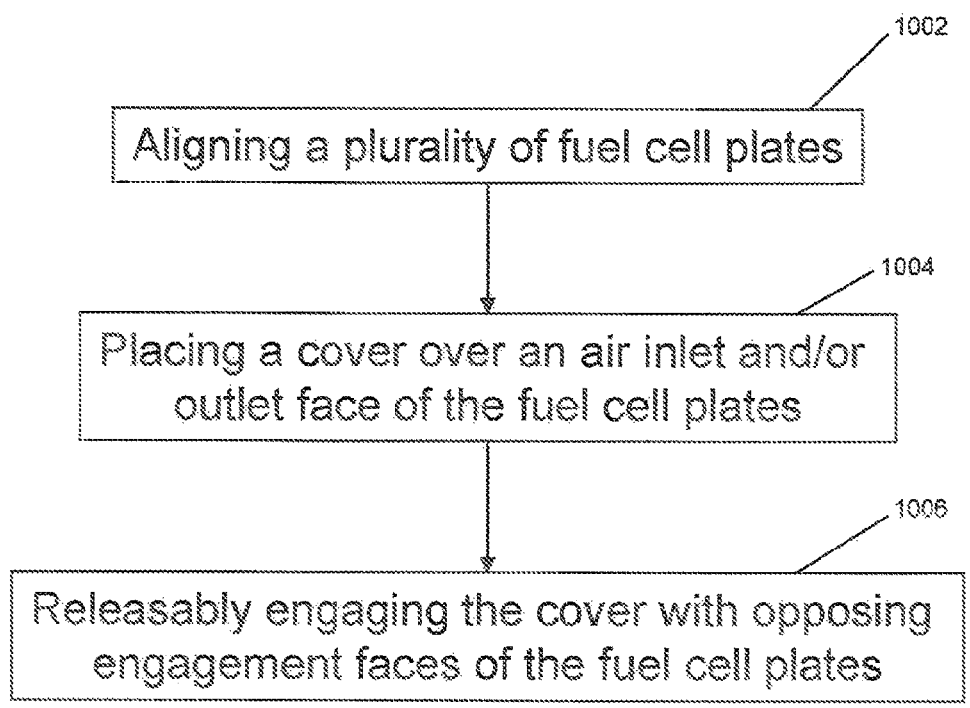

FIG. 10 illustrates a method of assembling a fuel cell assembly according to an embodiment of the invention.

The method starts at step 1002 by aligning a plurality of fuel cell plates that will, upon compression, provide a fuel cell stack. An end plate can be provided at each end of the stack as is known in the art. Each of the fuel cell plates has an air inlet face and/or an air outlet face, as well as two opposing engagement faces.

Optionally, the fuel cell plates may be compressed such that they are nearly at a working dimension. For example, the fuel cell plates may be compressed such that they define a stack that is 10 mm longer than the desired working dimension of the stack. It can be advantageous to avoid compressing the stack to its working dimension at this time so as to enable the detachable cover to be easily inserted between the end plates of the stack.

The method continues at step 1004, by placing a detachable cover over the air inlet faces and/or placing a detachable cover over the air outlet faces of the fuel cell plates in order to provide an air chamber between the cover and the fuel cell plates. As discussed above, this method step 1004 can involve placing an engagement region of the detachable cover in the vicinity of the engagement surfaces of the fuel cell plates.

The method can optionally continue by compressing the fuel cell plates and end plates to their working dimension in order to engage the detachable cover with both of the end plates. In this way, the ends of the air chamber are defined by the end plates.

In embodiments that use non-circular rods to engage the fuel cell plates, the method can continue by inserting the rods between the detachable cover and the fuel cell plates. It will be appreciated that the rods can be considered as optional as alternative engagement means between the cover and the plates are discussed below.

The method concludes in this embodiment at step 1006 by releasably engaging the cover with the opposing engagement faces of the fuel cell plates. For examples that use rotatable rods, step 1006 can be implemented by rotating the rods to engage both the detachable cover and the plates.

It will be appreciated that the non-circular rods are not essential for engaging the detachable cover to the fuel cell plates in all embodiments. A non-exhaustive list of alternatives to releasably engaging the detachable cover to the fuel cell plates includes:

The fuel cell plates, possibly projections from the fuel cell plates, may have one or more barbs that the detachable cover can be pushed onto. Optionally, there could be a cavity between the fuel cell plates and the detachable cover that is pre-filled or later injected with a sealant.

The detachable cover could be longitudinally (along the length of the fuel cell stack) slid over the assembly of fuel cell plates, possibly projections from the fuel cell plates, and then sealant injected. This is in contrast to embodiments that involve pushing the detachable cover onto the fuel cell plates from above.

The detachable cover may have an articulated claw feature that engages with the fuel cell plates. This is in contrast to embodiments that involve a fixed recess that clamps onto the assembly of projections.

A rod with a varying cross-section along its length can be used so that it can be pushed longitudinally into place to releasably engage the detachable cover and the fuel cell plates. In this way, the rod can be considered as having a varying cross-sectional radius along the length of the rod. This is in contrast to embodiments where a rotating cam rod is used.

A tube that is hydraulically or pneumatically expandable when in place can be used to engage the detachable cover and plurality of fuel cell plates. This is in contrast to embodiments that use a rotatable rod.

The moulded projections on the fuel cell plates could each include a hole that when assembled creates a gallery running the length of the stack assembly. The hole could have a small groove connecting to the profile of the projection, liquid sealant/adhesive is injected into the assembled gallery transferring a small amount of sealant to the profile of the projection (via the groove) filling the small cavity between the projections and an inner surface of the recess in the engagement region of the detachable cover. As the pressure in the small groove rises, the projections expand thereby filling the whole cavity in the recess. The sealant/adhesive is then allowed to cure, creating a permanent or semi-permanent attachment.

Alternatively, the cover may simply engage the fuel cell plates by friction fit.

Embodiments described herein can reduce the effects of the cathode delivery manifold pressure drop down defined and fixed air ports within a bipolar plate in a fuel cell plate. This can promote uniform air distribution per cell in the stack and allow the fuel cell stack assembly to be an independent module with the inlet and exhaust air boxes configured to meet the specific requirements of the application and system architecture, thus allowing complete integration of the stack module into the system.

A single component air box/detachable cover can replace the methods common in the art of using the lamination of membranes, sub gaskets, seal materials and bipolar plates that are arranged in a manner so as to generate an air delivery gallery within the stack structure. Providing flexibility for contouring the cross sectional profile of the air box in all three dimensions allows for tuned cathode flow deliveries and integrated exhausts functions around the core fuel cell module. In addition, the air boxes can become multifunctional and incorporate pre-heaters, filters, hot wire mass flow components, water separators, water storage, pumps, anode or cathode recirculation components, sensors, heat exchangers, condensers, etc, all in a protected, monitored and controlled environment. This can allow the full integration of such components into the system. Primary series components such as compressors, blowers, heat exchangers and condensers can be attached directly to dedicated air box geometries and the boxes could contain features such as tube plates for an exchanger matrix or customized interfaces for compressors.

Embodiments described herein can avoid using known pipe work for providing air to the air inlet faces of fuel cell stacks. Therefore, flow dynamics can be improved, and the associated pressure drops within the system reduced, by not connecting the primary system components with pipe work. In addition, it can be possible to assemble fuel cell stack of virtually any length (including virtually any number of fuel cell plates) as the constraints of known cathode air delivery galleries within the fuel cell plates can be avoided.

Features of fuel cell assemblies disclosed herein can enable the fuel cell engine to be packaged within a smaller volume allowing for a greater range of application.

A further advantage of embodiments disclosed herein is that the stack assembly can withstand much higher vibration, shock and G loadings without the plates slipping from position. This is because the detachable covers provide a common component that the fuel cell plates are physically attached to. In turn, the detachable cover can be fixed to the end plate assemblies to further improve the mechanical structure of the stack assembly. These characteristics can also address any issues that may arise from the fuel cell plates slumping through their own mass over time.

The invention claimed is:

1. A fuel cell assembly comprising:
a plurality of fuel cell plates in a stack, the stack defining:
   an air inlet face and/or an air outlet face; and
   two opposing engagement faces; and
a detachable cover configured to releasably engage the two engagement faces in order to define an air chamber with the air inlet or outlet face.

2. The fuel cell assembly of claim 1, further comprising two rods having a non-circular cross-section, wherein each rod extends alongside one of the engagement faces and is rotatable so as to releasably provide a seal between the detachable cover and the respective engagement face.

3. The fuel cell assembly of claim 2, wherein the rods are cam shaped in cross-section or circular with a flattened edge in cross-section.

4. The fuel cell assembly of claim 2, wherein the detachable cover comprises recesses for receiving the rods.

5. The fuel cell assembly of claim 1, wherein the plurality of fuel cell plates each comprise two projections, each projection associated with one of the two engagement faces, and wherein the detachable cover is configured to releasably engage the projections.

6. The fuel cell assembly of claim 5, wherein the two projections extend the engagement face beyond the air inlet or outlet face.

7. The fuel cell assembly of claim 5, wherein the two projections are deformable in response to rotation of a rod.

8. The fuel cell assembly of claim 7, wherein the projections are elastomeric.

9. The fuel cell assembly of claim 5 further comprising:
two rods having a non-circular cross-section, wherein each rod extends alongside one of the engagement faces and is rotatable so as to releasable provide a seal between the detachable cover and the respective engagement face; and, wherein the detachable cover comprises two recesses, each recess configured to receive one of the two rods and one of the two projections, the recesses having a first inner surface for engaging the respective projection and a second inner surface for engaging the respective rod.

10. The fuel cell assembly of claim 9, wherein each projection comprises a projection lip and each recess comprises a recess lip, wherein the projection lip is configured to engage with the recess lip when the projection is located in the recess in order to restrict movement of the projection out of the recess.

11. The fuel cell assembly of claim 1, wherein the stack comprises two end plates configured to engage with the detachable cover in order to define two opposing ends of the air chamber.

12. The fuel cell assembly of claim 1, wherein the detachable cover comprises an air chamber inlet and/or an air chamber outlet, and wherein the detachable cover is configured to define the air chamber with a varying cross-sectional area as the air chamber extends towards the air inlet or air outlet.

13. The fuel cell assembly of claim 1, wherein the detachable cover is a first detachable cover configured to define an air chamber with the air inlet face, the fuel cell assembly further comprising a second detachable cover configured to releasably engage two engagement faces in order to define an air chamber with the air outlet face.

14. The fuel cell assembly of claim 1, further comprising a heat exchanger in fluid communication with the air chamber.

15. The fuel cell assembly of claim 14, wherein the heat exchanger is attached directly to the cover.

16. The fuel cell assembly of claim 1, further comprising:
a plurality of fuel cell assemblies, wherein the detachable covers of each of the fuel cell assemblies are in fluid communication with at least one detachable cover of another fuel cell assembly.

17. A method of assembling a fuel cell stack assembly, the method comprising:
aligning a plurality of fuel cell plates, the fuel cell plates each having an air inlet face and/or an air outlet face and two opposing engagement faces;
placing a detachable cover over the air inlet face or outlet face of the fuel cell plates; and
releasably engaging the detachable cover with the engagement faces of the fuel cell plates, thereby defining an air chamber between the air inlet face or outlet face and the detachable cover.

18. A method of assembling a fuel cell stack assembly, the method comprising:
aligning a plurality of fuel cell plates with an end plate at each end, the fuel cell plates each having an air inlet face and/or an air outlet face and two opposing engagement faces;
placing a detachable cover over the air inlet face or outlet face of the fuel cell plates;
compressing the plurality of fuel cell plates together such that the end plates engage with the detachable cover;
inserting rods between the detachable cover and the engagement faces, the rods having a non-circular cross-section; and
rotating the rods in order to releasably engage the detachable cover and the engagement faces, thereby defining an air chamber between the air inlet face or air outlet face, the detachable cover and the end plates.

* * * * *